(12) United States Patent
Trenner et al.

(10) Patent No.: US 6,186,570 B1
(45) Date of Patent: Feb. 13, 2001

(54) GRIPPING DEVICE

(75) Inventors: Albrecht T. Trenner, Langendorf; Christian Wullschleger, Solothurn, both of (CH)

(73) Assignee: Montech AG (CH)

( * ) Notice: Under 35 U.S.C. 154(b), the term of this patent shall be extended for 0 days.

(21) Appl. No.: 09/333,393

(22) Filed: Jun. 15, 1999

(30) Foreign Application Priority Data

Jul. 8, 1998 (DE) ................................ 198 30 436

(51) Int. Cl.⁷ .................................................. B25J 15/08
(52) U.S. Cl. ........................................ 294/119.1; 294/88
(58) Field of Search ............................. 294/88, 94, 116, 294/119.1; 901/37

(56) References Cited

U.S. PATENT DOCUMENTS

| | | | |
|---|---|---|---|
| 4,913,481 | * 4/1990 | Chin et al. | 294/119.1 |
| 5,125,708 | * 6/1992 | Borcea et al. | 294/119.1 |
| 5,224,747 | * 7/1993 | Tsuchiya et al. | 294/119.1 |
| 5,529,359 | * 6/1996 | Borcea et al. | 294/119.1 |
| 5,595,413 | * 1/1997 | McGeachy et al. | 294/119.1 |
| 5,871,250 | * 2/1999 | Sawdon | 294/119.1 |
| 5,967,581 | * 10/1999 | Bertini | 294/119.1 |

* cited by examiner

Primary Examiner—Dean J. Kramer
(74) Attorney, Agent, or Firm—Bachman & LaPointe, P.C.

(57) ABSTRACT

The gripping device includes two gripper jaws operative to hold gripping elements thereon, a drive operative to move the gripper jaws, a housing for the gripper jaws, and at least one channel having channel walls. The gripper jaws are arranged in the channel such that they can move parallel to each other.

11 Claims, 4 Drawing Sheets

GRIPPING DEVICE

Figure 1:
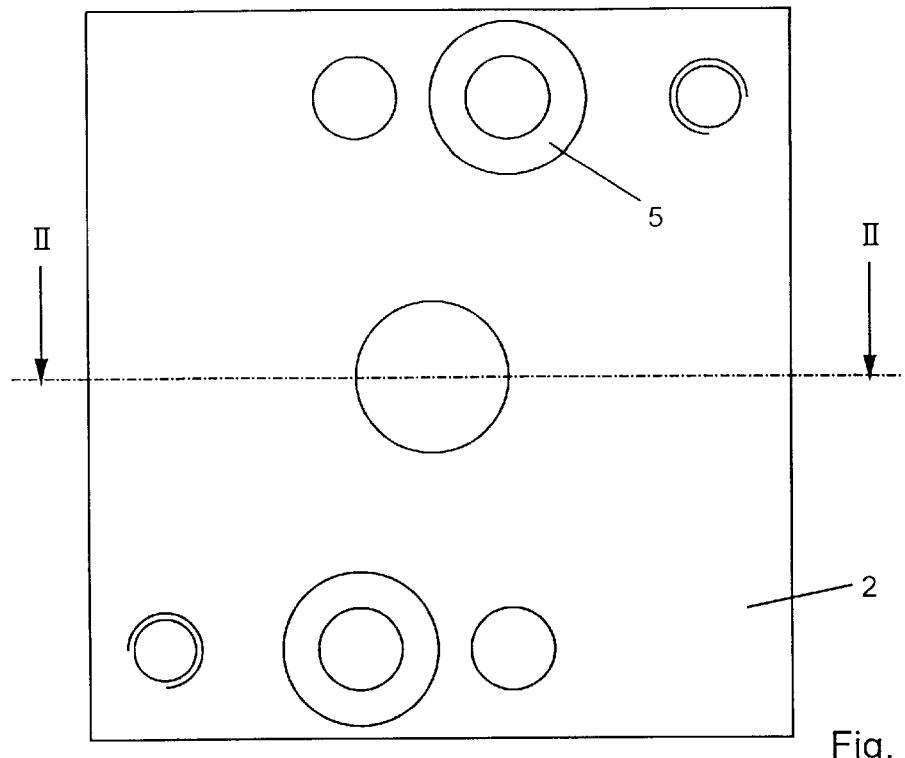

The invention relates to a gripping device having gripping elements on gripper jaws, a drive being assigned to the gripper jaws to move them.

Gripping devices of this type of diverse form and design are known. Reference is made, for example, to FR-A-2 635 481 in which two gripper jaws run axially parallel to each other and are supported against channel walls via bearings. In this case, the drive is performed by a toothed rack, toothed wheels and a pressure-actuated toothed piston which are all assigned to the gripper jaws. The overall size of a gripping device of this type is large, the drive is complicated.

EP 0 293 153 A1 discloses a parallel gripper in which the gripping elements are likewise arranged in an axially parallel manner. In this case too, the gripping elements are supported against the channel walls via bearings. The gripping elements are moved via a toggle lever drive.

DE 94 20 108 U1 shows a parallel gripper having two gripper jaws which can be moved in an axially parallel manner by a drive. A multiplicity of drive options are indicated, some of which are very complicated.

Furthermore, a gripping device of the above-mentioned type is shown in DE 39 41 800 A1 in which, in turn, the gripper jaws are moved in an axially parallel manner by means of drivers guided in slotted links.

The present invention is based on the object of developing a gripping device of the above-mentioned type; the overall size of which can be substantially reduced and the drive of which is improved.

The achievement of this object has resulted in two gripper jaws being arranged such that they can be moved parallel to each other in, preferably, one channel of a housing.

This means that the guiding of the two gripper jaws is able to stress approximately the entire length of the channel, which has the consequence of the jaw guides being subjected to substantially lower bearing forces during the actual gripping procedure.

In order for the gripper jaws to have as little guide friction as possible, said jaws run on bearings, preferably on rolling bodies. One row of rolling bodies is situated in each case between the outside of each gripper jaw and the corresponding channel wall. Two rows of rolling bodies which are situated one above another are arranged on the inside of the two gripper jaws. This arrangement has the advantage of being absolutely precise geometrically, largely irrespective of how precisely the individual parts used therein are machined.

A respective driving pin, on which a respective driving roller runs, protrudes out of the gripper jaws into a slotted-link slot. The slotted-link slot is situated in a slide which is connected fixedly via a pin to a piston as part of the drive. The piston moves back and forth preferably between two pressurizable chambers and in doing so carries the slide with it via the pin in one or other direction. Since the median of the slotted-link slot limbs, which are arranged in a V-shape, lies in the axis of movement of the gripper jaws but said axis of movement for its part runs perpendicularly to the piston movement, when the piston is displaced the gripper jaws execute a synchronous, opposed movement.

The gripping device according to the invention is convincing not just because of its simplicity which is expressed by the small number of necessary individual parts and which permits the device to be produced with extremely small external dimensions, but also because of its great mechanical efficiency which it exhibits because of the use of rolling-body guides on all the highly stressed, moveable parts.

A change to the vertical angle which the slotted-link slot limbs form makes it possible to construct gripping devices which achieve different gripping-force maxima with the same pressurization.

Figure 2:
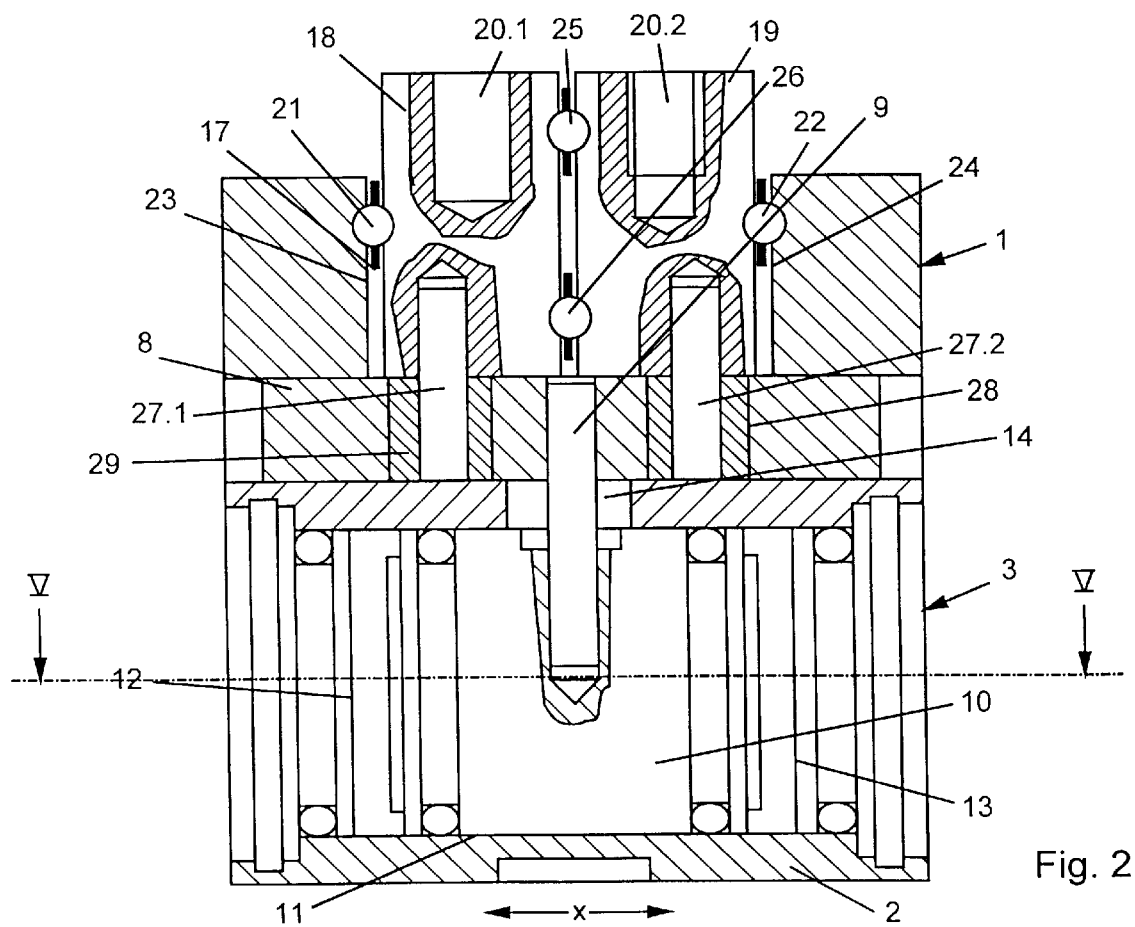
Figure 3:
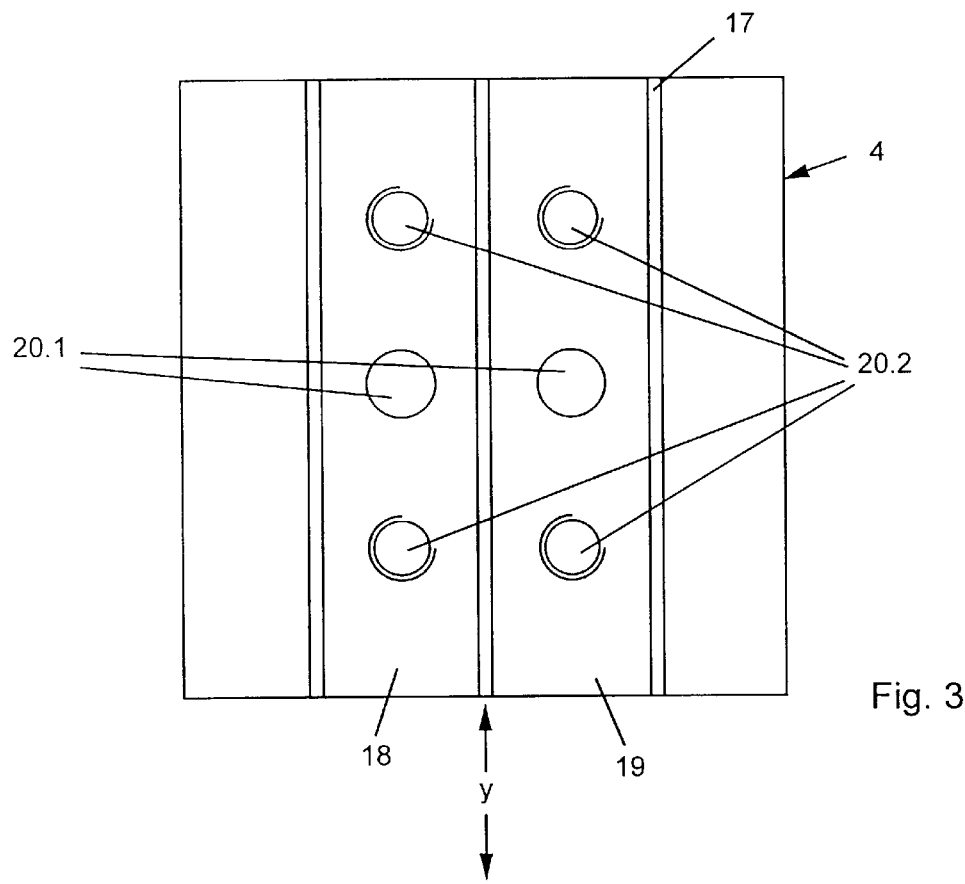
Figure 4:
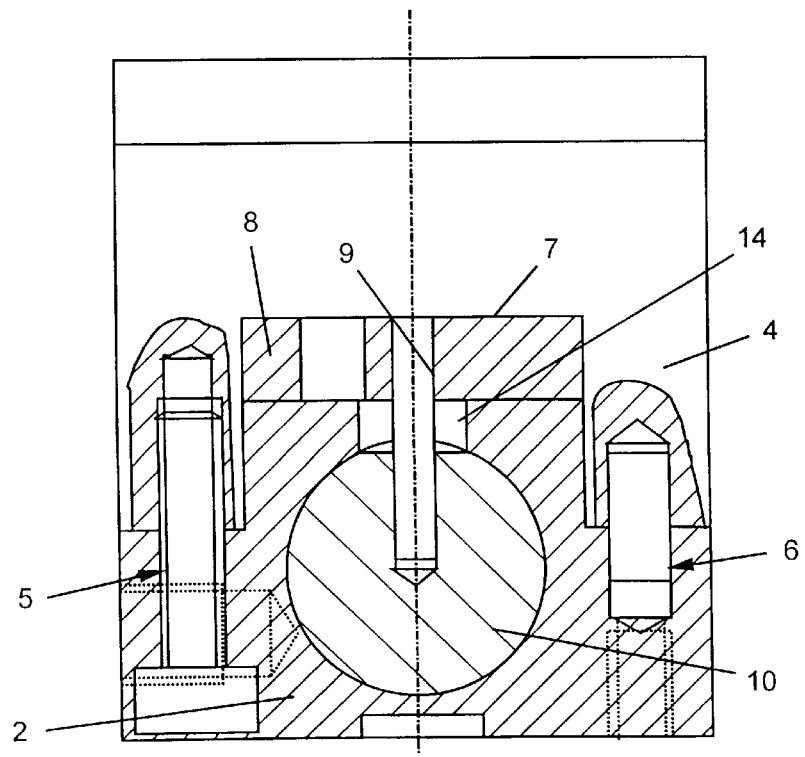
Figure 5:
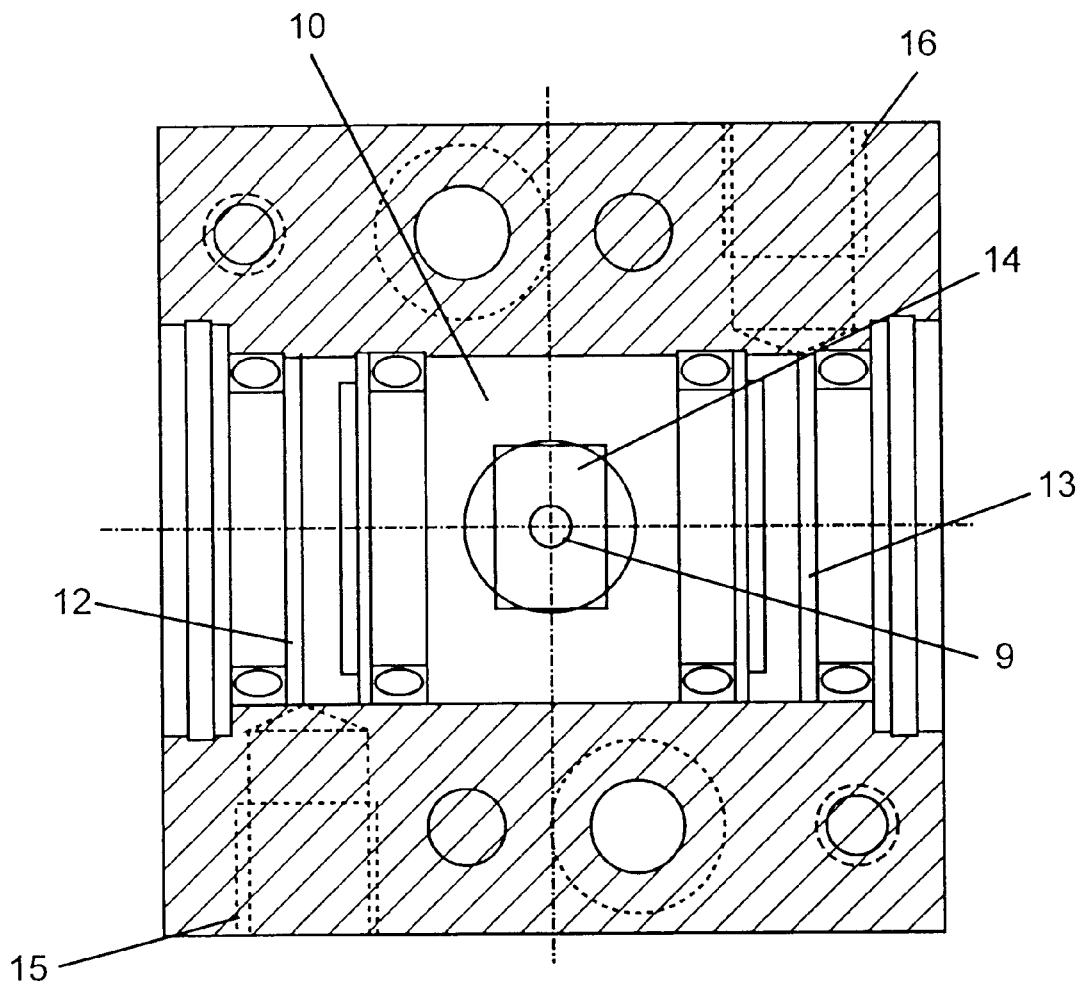

Further advantages, features and details of the invention emerge from the following description of preferred exemplary embodiments and with reference to the drawing; the drawing shows in FIG. 1 a plan view of a gripping device according to the invention;

FIG. 2 a cross section through the gripping device according to FIG. 1 along line II—II;

FIG. 3 a view from below of the gripping device according to FIG. 1;

FIG. 4 a side view shown partially broken away of the gripping device corresponding to FIG. 2;

FIG. 5 a cross section through the gripping device according to FIG. 2 along line V—V;

FIGS. 6a to 6c plan views of the opened gripping device according to FIGS. 1 to 5 with a slide in a different position of use in each case.

The gripping device according to the invention has a housing 1 which in the present exemplary embodiment consists of two parts. A drive 3 (see FIG. 2), which is described below in more detail, is situated in a base part 2 (see FIG. 4). A U-shaped guide part 4 is seated on the base part 2, connecting elements 5 and 6 for the connection of base part 2 and guide part 4 being provided.

Together with the base part 2, the guide part 4 forms an inner guide channel 7 for a slide 8, this slide 8 being connected via a pin 9 to a piston 10. This piston 10 is situated, in a manner such that it can be displaced in the direction of the double arrow x, in a cylindrical space 11 in the base part 2, pressure chambers 12 and 13 for receiving an appropriate pressure medium, for example air, being provided on both sides of the piston 10.

When the pressure chambers 12 or 13 are pressurized, the piston 10 is displaced in the cylindrical space 11 and as it does so carries along the slide 8 via the pin 9. A recess 14 is provided in the base part 2 so that the pin 9 can be moved in the base part 2.

FIG. 5 moreover indicates connecting points 15 and 16 to a corresponding pressure-medium source by dashed lines, the connecting points 15 and 16 opening into the corresponding pressure chamber 12 and 13. At right angles to the direction x for the slide 8, the guide part 4 according to FIGS. 2 and 3 has made in it a channel 17 in which two gripper jaws 18 and 19 are mounted displaceably. These gripper jaws 18 and 19 can be displaced parallel to each other in the direction x. They have pin holes 20.1 and threaded holes 20.2 which serve to receive customized fingers or gripping elements.

Particularly in FIG. 2 it can be seen that each gripper jaw 18 and 19 is supported against a channel wall 23 and 24 via a respective ball retainer 21 and 22. Furthermore, the gripper jaws 18 and 19 are mutually supported via two ball retainers 25 and 26.

A respective driving pin 27.1 and 27.2 protrudes downward from each gripper jaw 18 and 19 and engages into a slotted-link slot 28 (shown in FIG. 2 and FIG. 6) in the slide 8. The driving pins 27.1 and 27.2 each furthermore have a driving roller 29 which is mounted rotatably on its particular driving pin.

Figure 6:
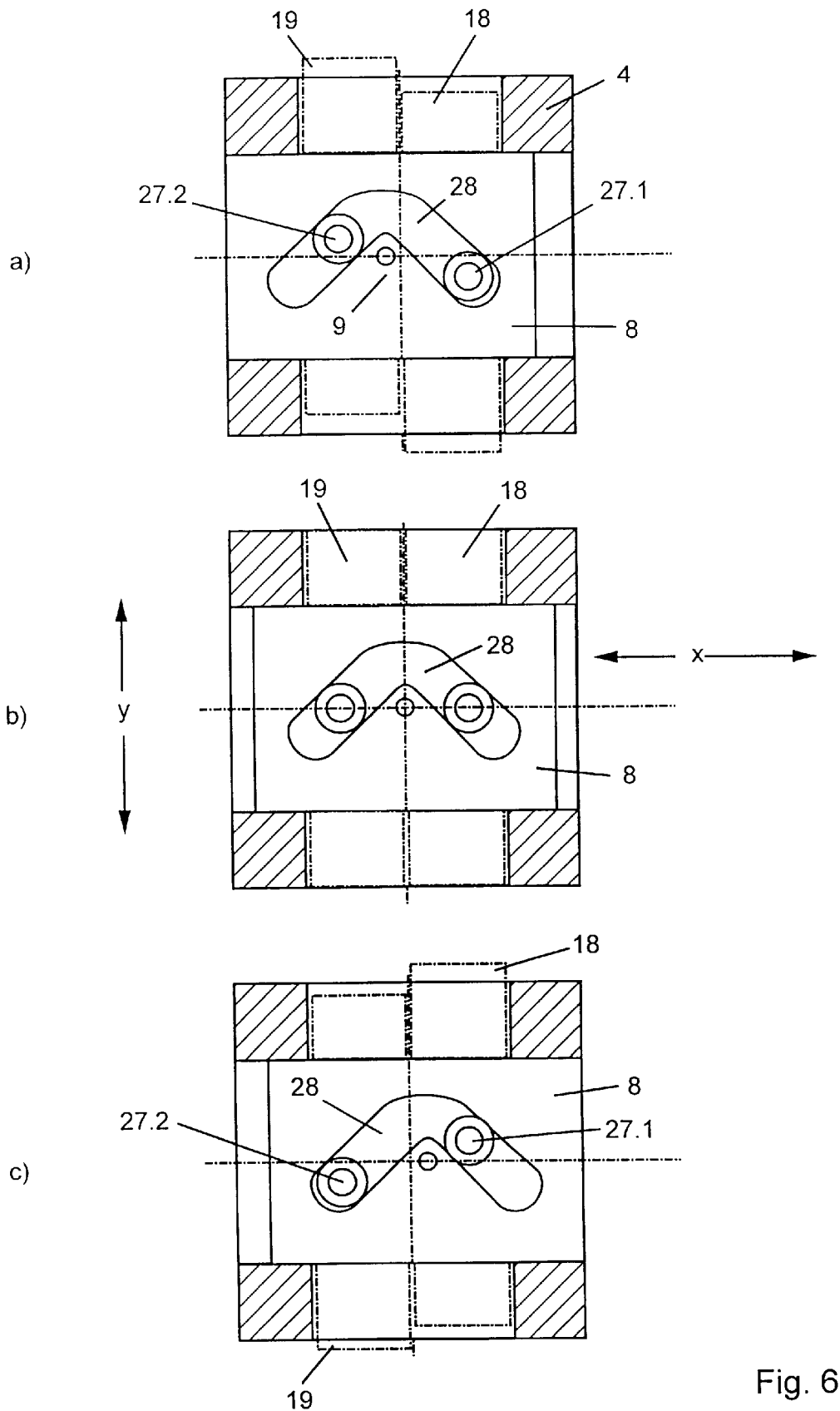

The manner in which the present invention functions is explained in more detail with reference to FIG. 6. In FIG. 6b it can be seen that the slide 8 is situated in a central position, the gripper jaws 18 and 19 being arranged precisely next to each other and their end surfaces being aligned with each other. If the slide is then displaced to the left corresponding to FIG. 6a, the driver 27.2, which is connected to the gripper jaw 19, climbs upward in the V-shaped slotted-link slot 28 while the driver 27.1 migrates downward. This means that the gripper jaw 19 is extended upward and the gripper jaw 18 downward. If, in contrast, corresponding to FIG. 6c the slide 8 is displaced to the right by the drive 3, the driver 27.1 climbs while the driver 27.2 migrates downward in the slotted-link slot 28. That is to say, the gripper jaws 18 and 19 carry out an opposed movement. A corresponding workpiece can thereby be secured or released by the gripping elements.

What is claimed is:

1. A gripping device, which comprises:

two gripper jaws operative to hold gripping elements thereon;

a drive operative to move said gripper jaws;

a housing for said gripper jaws;

at least one channel having channel walls;

bearing elements in said channel operative to support the gripper jaws against each other and against the channel walls;

wherein said gripper jaws each have an outside surface and an inside surface, with at least one bearing element between each outside surface and the channel walls, and with at least two bearing elements between the inside surfaces, one bearing element above the other; and wherein said gripper jaws are situated so that they can move parallel to each other in said channel supported by said bearing elements against said channel walls and against each other.

2. A gripping device according to claim 1, including a single channel.

3. A gripping device according to claim 1, wherein said bearing elements are rolling ball retainers.

4. A gripping device according to claim 1, including at least one driving pin protruding from at least one gripper jaw and a slide having a slotted-link slot, wherein said pin engages said slot.

5. A gripping device according to claim 4, including driving pins protruding from both gripper jaws and both pins engaging at least one of said slots in said slide.

6. A gripping device according to claim 5, wherein said driving pins are seated in said slot by means of a respective driving roller.

7. A gripping device according to claim 5, wherein said slot has a V-shaped profile.

8. A gripping device according to claim 4, wherein the drive is connected to the slide.

9. A gripping device according to claim 8, wherein the drive has a pressurizable piston in a cylindrical space, the piston being connected to the slide via a pin.

10. A gripping device according to claim 9, including a pressure chamber provided on both sides of the piston for connection to a pressure-medium source.

11. A gripping device according to claim 1, including a single housing element.

* * * * *